United States Patent

Johnson

[15] 3,644,836
[45] Feb. 22, 1972

[54] NONLINEAR COMPENSATION NETWORK

[72] Inventor: Roy D. Johnson, Annapolis, Md.

[73] Assignee: The United States of America as represented by the Secretary of the Navy

[22] Filed: Sept. 2, 1970

[21] Appl. No.: 69,085

[52] U.S. Cl.............................328/143, 235/197, 307/229, 307/230, 328/163
[51] Int. Cl......................G06g 7/12, H03k 5/00, H03b 1/00
[58] Field of Search...............307/229, 230; 328/142, 143, 328/145, 163, 162; 235/197

[56] References Cited

UNITED STATES PATENTS

| | | | |
|---|---|---|---|
| 3,560,727 | 2/1971 | Schussler | 307/229 X |
| 3,525,052 | 8/1970 | Clark | 328/162 X |
| 3,535,549 | 10/1970 | Herrero | 307/230 X |
| 3,557,347 | 1/1971 | Robertson | 235/197 X |

Primary Examiner—Stanley D. Miller, Jr.
Attorney—Richard S. Sciascia and Q. E. Hodges

[57] ABSTRACT

A compensation network having as an input a nonlinear transducer generated signal, which produces a linear signal by balancing out the nonlinearities in the transduced signal. Compensation is achieved by a plurality of individually operated slope circuits. Each slope circuit is actuated at a particular break point or voltage level of the sensor signal. When actuated the slope circuit produces a signal which compensates for the nonlinearity. The compensator includes break point circuits actuating each slope circuit at the predetermined break point voltage and the break point circuits are closed-loop design minimizing amplifier instability and temperature shift.

10 Claims, 5 Drawing Figures

INVENTOR.
ROY D. JOHNSON
BY *D. E. Hodges*
ATTORNEY

NONLINEAR COMPENSATION NETWORK

The invention described herein may be manufactured and used by or for the Government of the United States of America for Governmental purposes without the payment of any royalties thereon or therefor.

SUMMARY OF THE INVENTION

Many transducers do not produce a linearly changing signal but produce a signal that is substantially linear with small nonlinearities. These small nonlinearities appearing throughout the usable range of the transducer signal can be balanced out by introducing a compensating signal of an opposite polarity and of equal amplitude to the nonlinearity represented by the difference between the sensed signal and the desired linear signal. The compensation signal cancels the nonlinear portion of the sensor signal leaving a linear signal. This result can be realized by generating compensation signals piece wise throughout the usable range of the sensor signal. Piece wise compensation is achieved by dividing the usable range of the sensor signal into a plurality of subdivisions. The signal points delineating the piece wise subdivisions are called break points. The break point voltage for each circuit is established at a predetermined higher level then a preceding circuit and is actuated when the sensor signal reaches the established break point voltage. The compensation circuit when actuated contributes a compensation signal amplitude to the sensor signal cancelling the nonlinearity within the signal. Once a compensation circuit has been actuated by the sensor signal, it stays actuated as long as the sensor signal is above the compensation network's break point voltage. By using a number of break point circuits to generate compensation signals, precise nonlinear compensation can be achieved piece wise along the range of the transducer signal. The precision with which the compensation network is used can be increased by increasing the number of break point compensation circuits.

Each break point circuit is a closed loop, making the network transfer characteristic virtually independent of the amplifier instability. In one model constructed with 10 stages a network accuracy of 0.1 percent of full scale over a 0°–65° C. temperature range was produced. Furthermore, the closed loop produces an unusual result: the inherent offset voltage of the circuit diodes are reduced by the large open loop amplification factor of the operational amplifier used in this device.

Accordingly, it is one object of this invention to linearize a nonlinear signal.

It is a second object of this invention to linearize a signal by compensating for nonlinearities at intervals along the operating range of the transducer.

It is a third object of this invention to compensate for nonlinearities in a transduced signal by generating a signal that is virtually free of amplifier drift.

It is a fourth object of this invention to compensate for the nonlinearities in the transduced signal with increased accuracy by reducing intrinsic diode offset voltage.

BRIEF DESCRIPTION OF THE DRAWINGS

These and other objects of the invention will become more apparent as the following description of the preferred embodiment is read in which.

DESCRIPTION OF THE PREFERRED EMBODIMENT

Figure 1:
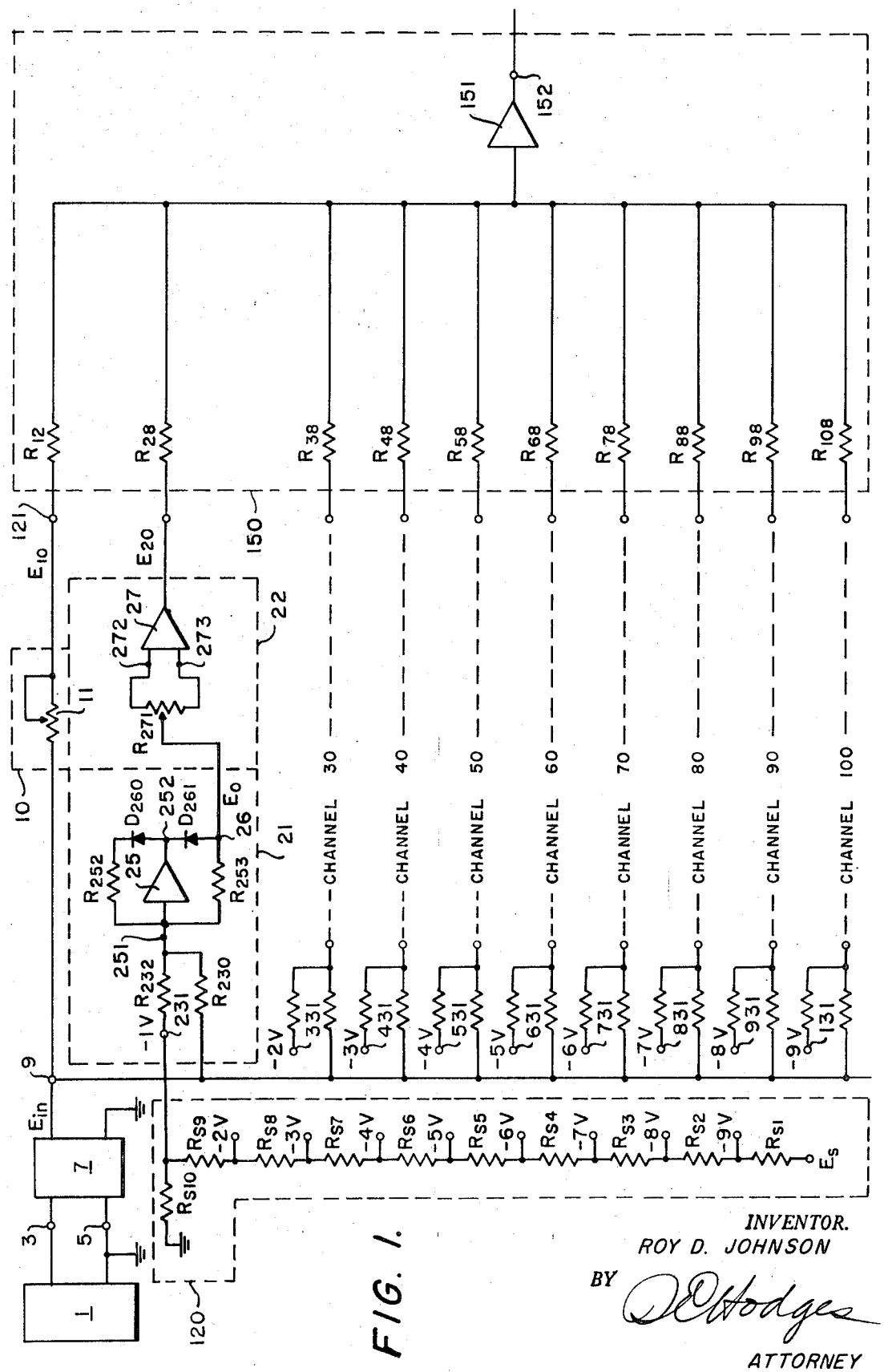
FIG. 1 shows the nonlinear compensation network.

Referring now to FIG. 1 the compensating network is shown to include a preamplifier 7 having input terminals 3 and 5. Transducer 1 is connected to terminals 3 and 5 and the signal produced by transducer 1 is amplified by preamplifier 7. Connected between preamplifier 7 and summing amplifier 150, in parallel are 10 compensating circuit channels numbered 10, 20, 30, 40, 50, 60, 70, 80, 90 and 100 with channels 30–100 partially shown. Each compensation channel with the exception of channel 10 includes a break point circuit, 21 shown in channel 20, and a slope circuit, 22 shown in channel 20. The slope circuit and the break point circuit are connected in series in each channel between the preamplifier 7 and a summing amplifier 150. Channels 30–100 each contain a break point circuit and a slope circuit, as shown in channel 20, and in this respect are identical to channel 20. The difference between each channel is the holdoff or break point voltage applied to each channel, as will be explained in the following description. Channel 10 differs from channels 20–100, the difference being that channel 10 includes a slope circuit but does not include a break point circuit. Channel 10 is shown to have a slope circuit containing a potentiometer 11. The setting of potentiometer 11 determines the compensation transfer characteristic, $E_{10}/E_{in}$ of channel 10. Resistor 12 in series with potentiometer 11 is the summing input resistance for channel 10 in the summing amplifier 150.

Referring now to channel 20, the operation of the break point circuit and slope circuit is described, the operation of the break point circuit and slope circuits of channels 30–100 being substantially as described for channel 20. Channel 20 is seen to have break point circuit 21 and slope circuit 22. Break point circuit 21 includes summing input resistance $R_{230}$ connected to the output of preamplifier 7. Connected to terminal 251 of operational amplifier 25 and to input resistance 230 is holdoff voltage input resistance $R_{232}$. The input to resistance $R_{232}$, terminal 231, is connected to the −1-volt terminal of the holdoff voltage source 120. As will be explained, 1 volt is then the break point or holdoff voltage for channel 20.

A feedback loop comprising diode $D_{260}$ in series with resistance $R_{252}$ is connected between output terminal 252 of operational amplifier 25 and the amplifier input terminal 251. A second feedback loop comprising diode $D_{261}$ and resistance $R_{253}$ is connected between output terminal 252 and input terminal 251 of operational amplifier 25. The difference between the two feedback loops being in the connection of the diodes: the anode of diode $D_{260}$ being connected to terminal 252 while the cathode of diode 261 is connected to output terminal 252. Operational amplifier 25 is a high-gain high-impedance operational amplifier. The signal appearing at terminal 251 is inverted and amplified producing a signal at terminal 252 which is opposite in polarity to the signal appearing at 251.

The break point circuit gain is equal to −1. For an input voltage, $E_{in} \geqq 1$ volt, applied to terminal 9, and a break point voltage of −1 volt applied to terminal 231, the break point circuit transfer characteristic for the voltage $E_0$ appearing at terminal 26 can be expressed as:

$$E_0 = (-1)\frac{R_{253}}{R_{232}} + E_{in}\frac{R_{253}}{R_{230}} \quad (1)$$

For signal amplitudes of $E_{in} < 1$, or less than the absolute value of the break point voltage, the signal impressed on terminal 251 will be negative resulting in a positive signal at terminal 252. The positive signal at terminal 252 back biases diode $D_{261}$ so that no signal appears at terminal 26, and the signal input to slope circuit 22 is zero. When $E_{in} > 1$ the signal appearing at terminal 252 is negative forward biasing diode 261 and the amplified $E_0$ signal appears at terminal 26. Similarly, each of the other channels, 30–100, will generate a signal only when the nonlinear input signal amplitude, summed with the particular channels break point voltage, is greater than zero.

The transfer function of equation (1) shows that the relationship of $E_0$ to $E_{in}$ is virtually independent of the amplification factor of the high-gain operational amplifier 25, and is a function of the ratio of the feedback resistance $R_{253}$ to the summing input resistances $R_{230}$ and $R_{232}$. By using feedback, the break point circuit is made independent of the inherent instability of the amplifier, eliminating any variation in output that would be present in open loop design.

Signal $E_0$ appearing at terminal 26 is applied to the potentiometer $R_{271}$ connected across the input terminals 272 and 273 of differential amplifier 27. It can be seen then that if potentiometer $R_{271}$ is adjusted so that equal signals appear at terminals 272 and 273, the output $E_{20}$ of channel 20 will be zero. If potentiometer $R_{271}$ is adjusted so that the difference between the voltages applied between terminals 272 and 273 is greater or less than zero, amplifier 27 will have an output $E_{20}$, the polarity of $E_{20}$ being positive or negative and dependent upon the relative signal amplitudes applied to the terminals 272 and 273 of amplifier 27. Resistance $R_{28}$ is connected from the output of amplifier 27 and is an input summing resistance in summing amplifier 150. Similarly resistances $R_{38}$, $R_{48}$, $R_{58}$, $R_{68}$, $R_{78}$, $R_{88}$, $R_{98}$, and $R_{108}$ are the summing amplifier input resistances for channels 30-100, respectively.

As previously stated the break point and slope circuits of channels 30-100 are similar to the slope circuit and break point circuit of channel 20, the only difference being the break point voltage applied to each channel, $-1$ volt applied to terminal 231 of channel 20, $-2$ volts applied to terminal 331 of channel 30, $-3$ volts applied to terminal 431 of channel 40, ... and $-9$ volts applied to terminal 131 of channel 100.

A holdoff voltage source 120 comprising a series of precision resistors $R_{s1}$–$R_{s9}$ is arranged in series with voltage source $E_s$ to provide the break point voltages of $-1$ volt through $-9$ volts in $-1$-volt steps.

Amplifier 25 may be any high-gain operational amplifier having an open loop gain in the order of $10^5$. Resistances $R_{230}$, $R_{232}$, $R_{252}$, and $R_{253}$ would then be in the order of 100 K ohms. These are typical values designed to provide an overall gain factor of $-1$ for each of the break point circuits of channels 20-100.

Figure 2:
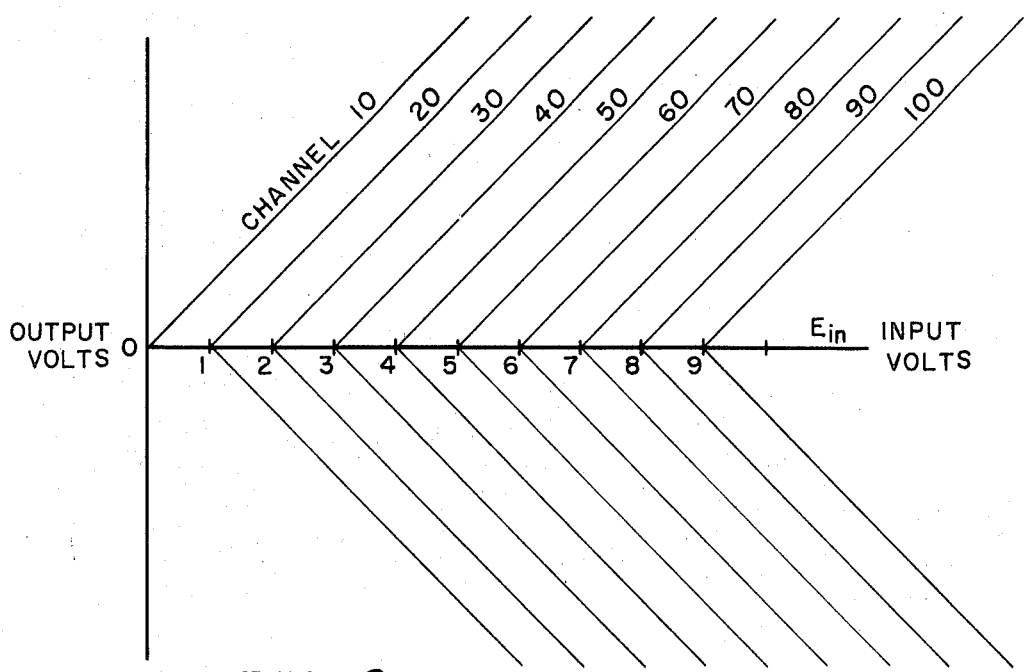
FIG. 2 shows the transfer curves for the break point circuits of the nonlinear compensation network of FIG. 1.

Referring now to FIG. 2 is seen typical transfer curves for channel 10 and for each of the break point circuits. As can be seen from FIG. 2 the output $E_{20}$ of channel 20 is zero for $E_{in}$ less than or equal the absolute value of holdoff voltage of one volt. For $E_{in}$ greater than 1 volt the output of channel 20 is proportional to $E_{in}$, the proportionality factor being dependent upon a setting of $R_{271}$.

Figure 2A:
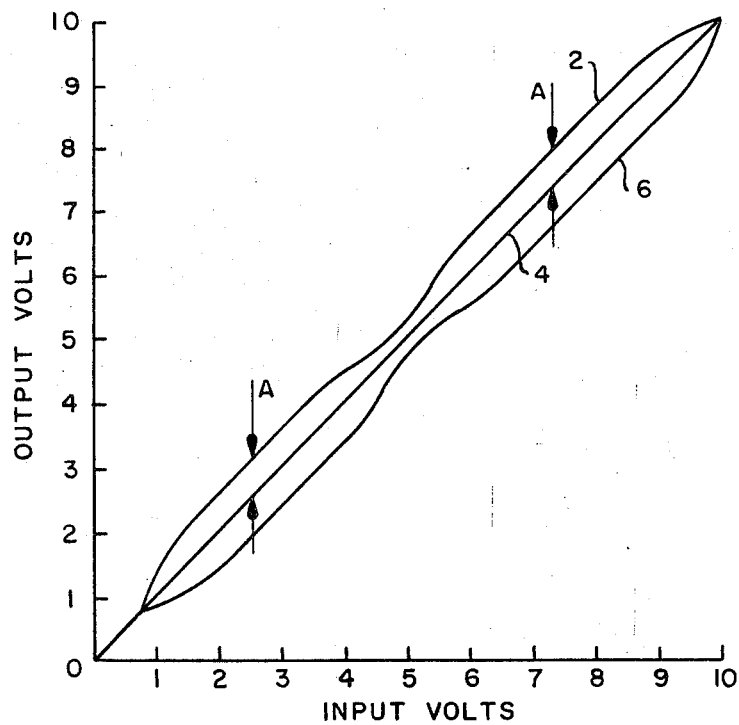
FIG. 2a shows the nonlinear signal, compensating signal and linearized signal.

Referring now to FIG. 2a a nonlinear signal 2 is shown as generated by transducer 1, amplified by preamplifier 7, passed through channel 10 and appearing at summing input terminal 121 of summing amplifier 150. The corresponding predetermined linearized signal response desired from output 152 of amplifier 151 is denoted by numeral 4. To balance out the nonlinearities of signal 2 denoted by signal amplitude differences A throughout the range of signal 2 and to produce the predetermined linear signal 4, each slope circuit of channels 20-100 is adjusted to apply a compensation signal to balance out the nonlinear portion of the transduced signal with an amplitude greater than the particular channels break point voltage. The compensation characteristic 6 is the combined outputs of channels 20-100 and is summed with the nonlinear signal produced at the output of channel 10 by summing amplifier 150. The summation produces the approximate linearized signal denoted by numeral 4. By way of example, if the difference between the nonlinear signal and the approximate linearized signal at the 2-volt break point was +0.3-volt, the slope circuit potentiometer $R_{271}$ of channel 20 would be adjusted to produce $-0.3$-volt at the output of amplifier 27. This balancing voltage would then be summed with the output of channel 10 to balance out the nonlinearity within the signal and to produce an approximately linearized signal. In a similar manner the outputs of channels 30-100 would be similarly adjusted to balance out the nonlinear portions of the signal.

Figure 3:
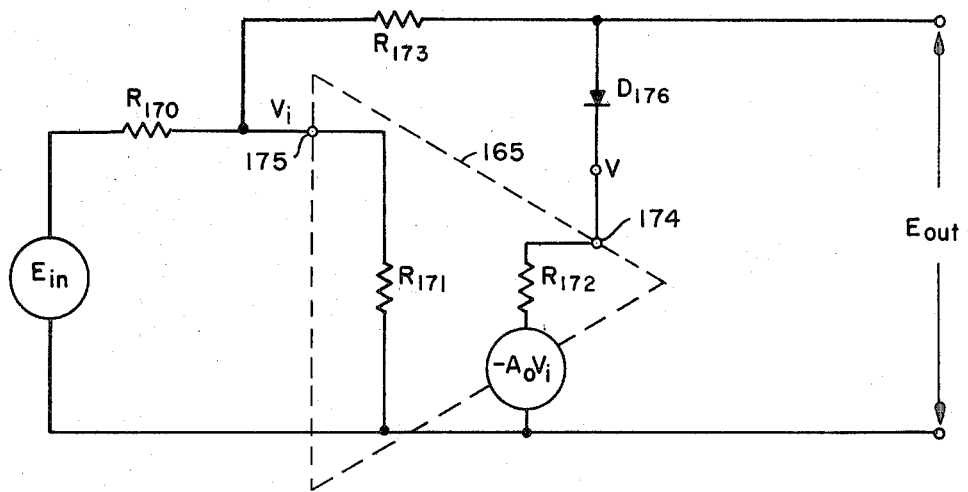
FIG. 3 shows a simplified low-frequency equivalent of the break point circuit of FIG. 1.
Figure 3A:
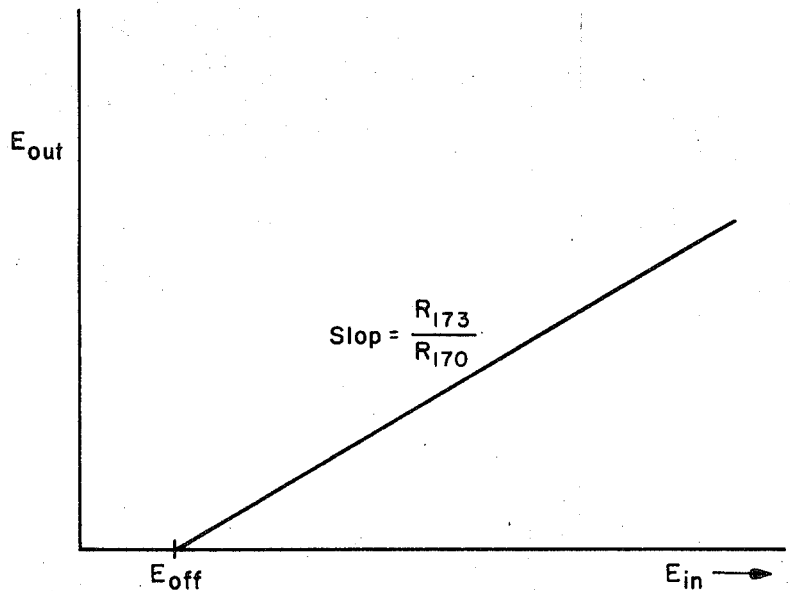
FIG. 3a shows the effect of the diode offset voltage on the simplified equivalent circuit of FIG. 3.

Referring now to FIG. 3 is seen a simplified equivalent circuit of the break point circuits of channels 20-100. The high-gain operational amplifier 165 is shown in phantom to include an input resistance $R_{171}$, an amplifier with the open loop DC voltage gain equal to $-A_0$, and open loop output resistance $R_{172}$. Connected between the output terminal 174 and the input terminal 175 of the operational amplifier is feedback resistance $R_{173}$ in series with diode $D_{176}$ having a diode offset voltage $E_{off}$ such that diode $D_{176}$ does not conduct until it is forward biased to a voltage equal to $E_{off}$, as shown in FIG. 3a, when the input voltage $E_{in}$ is low enough such that $|V-V_i| < E_{off}$, diode $D_{176}$ is an open circuit. Under this condition feedback resistance $R_{173}$ is decoupled from the input and $E_{out}$ is equal to zero. Consequently, the voltage at the summing point $V_i$ is simply:

$$V_i = \frac{R_{171}}{R_{170} + R_{171}} E_{in} \qquad (2)$$

Using this expression the voltage $V$ is:

$$V = \frac{-A_0 R_{171}}{R_{170} + R_{171}} E_{in}$$

The input voltage $E_{in}$ at which diode 176 begins to conduct can then be obtained by solving the equation:

$$E_{in} \left( \frac{-A_0 R_{171}}{R_{170} + R_{171}} - \frac{R_{171}}{R_{170} + R_{171}} \right) = E_{off} \qquad (3)$$

$$E_{in} = \frac{E_{off}}{\frac{R_{171}}{R_{171} + R_{170}} (A_0 + 1)} = E_{so} \qquad (4)$$

The expression of equation (4) for $E_{in}$ is the effective shutoff voltage, $E_{so}$ for the circuit of FIG. 3 due to the diode $D_{176}$ offset voltage $E_{off}$. However, since $A_0$ is substantially greater than one, $E_{so}$ may be expressed as:

$$E_{so} = \frac{E_{off}}{\frac{R_{171} A_0}{R_{170} + R_{171}}} \qquad (5)$$

If $R_{171}$ is substantially greater than $R_{170}$ then equation can be simplified to:

$$E_{so} = \frac{E_{off}}{A_0} \qquad (6)$$

It can be seen therefore, that diode offset voltage $E_{off}$, reduced by the open loop gain $A_0$ eliminates the inaccuracy produced in the break point circuit by the intrinsic diode offset voltage and any drift in the intrinsic diode offset voltage.

Obviously many modifications and variations of the present invention are possible in the light of the above teachings. It is therefore to be understood that within the scope of the appended claims the invention may be practiced otherwise than as specifically described.

What is claimed is:

1. A compensation network for balancing out the nonlinear amplitude components in the output of a transducer having a nonlinear responsive output signal amplitude characteristic, and producing a signal having a predetermined and corresponding amplitude characteristic linearly responsive to the transducer input comprising:

means to generate a compensating signal equal in amplitude to the difference between the nonlinear signal amplitude and the corresponding predetermined linear signal amplitude;

said compensating signal being of one polarity when said transducer output amplitude exceeds said predetermined characteristic and being of the opposite polarity to said one polarity when said transducer output is less than said predetermined characteristic;

summing means having a plurality of summing input terminals;

a first of said summing terminals connected to receive said compensating signal;

a second of said summing input terminals connected to receive the nonlinear output signal; and said summing means summing said compensating signal and said nonlinear output signal and producing a summation signal having an amplitude corresponding to the predetermined linearly responsive characteristic.

2. The network of claim 1 wherein said compensating signal generating means includes:

a break point means for generating a signal in response to the nonlinear signal amplitude within a preselected range;

a selectable holdoff voltage means;
said break point means having summing means;
said break point summing means connected to receive said nonlinear output signal and connected to receive a selected holdoff voltage;
said break point means having an output terminal;
said break point means having no output signal at said break point output terminal when the summation of said nonlinear output signal amplitude summing and the selected holdoff voltage by said break point summing means is less than or equal to zero; and
said break point means generating a signal output at said break point output terminal when the summation of said selected holdoff voltage and said nonlinear signal, by said break point summing means is greater than zero, whereby said break point circuit can be selectively made operable over the range of said nonlinear signal.

3. The network of claim 1 wherein said compensating signal-generating means includes a plurality of compensating channels;
each of said channels including input terminal means and output terminal means;
each of said channel input terminal means connected to receive said nonlinear signal; and
each of said plurality of summing input terminals connected to the output of a corresponding compensating channel output terminal means.

4. The network of claim 3 wherein each of said compensating channels includes a break point means;
said break point means generating a signal in response to the nonlinear signal output amplitudes within a selected range;
said break point means having first and second summing input terminals;
said first summing input terminal connected to receive said nonlinear output signal and said second summing input terminal connected to a selected holdoff voltage; and
said break point means generating an output signal with an amplitude greater than zero when the summation of said nonlinear output signal and said selected holdoff voltage is greater than zero and generating an output signal of an amplitude equal to zero when the summation of said nonlinear output signal and said selected holdoff voltage is equal to or less than zero.

5. The network of claim 4 wherein said break point means includes an operational amplifier having an output terminal and an inverting input terminal;
first summing impedance connected between said first summing input terminal and said inverting input terminal;
a second summing impedance connected between said inverting input terminal and said second summing input terminal;
a first feedback means connected between said amplifier output terminal and said inverting input terminal; and
said first feedback path comprising a first diode having its cathode connected to said amplifier output terminal and a first feedback impedance connected to said inverting input terminal.

6. The network of claim 5 wherein the signal generated by said break point circuit is proportional to the holdoff voltage and the nonlinear output signal as expressed by the relationship:

$$E_0 = V_{h.o.} \frac{R_3}{R_2} + E_{in} \frac{R_3}{R_1}$$

where
$E_o$ is the break point signal output signal;
$V_{h.o.}$ is the holdoff voltage;
$R_3$ is the first feedback impedance;
$R_2$ is the second summing impedance;
$R_1$ is the first summing impedance.

7. The network of claim 5 wherein the first feedback diode offset voltage is effectively reduced by the operational amplifier open loop gain by the factor $1/A_o$ where $A_o$ is the open loop gain of the amplifier.

8. The network of claim 3 wherein said channels each include a slope means connected to receive and amplify the signal generated by said break point means generating a controllable output signal;
said slope means having an output terminal connected to its respective channel output terminal.

9. The network of claim 8 wherein controllable output signal of said slope means is linearly proportional to the signal generated by said break point means.

10. A method for balancing out the nonlinear amplitude components in the output of a transducer having a nonlinear responsive output signal amplitude characteristic, and producing a signal having a predetermined and corresponding amplitude characteristic linearly responsive to the transducer input, comprising the steps of:
generating a compensating signal equal in amplitude to the difference between the nonlinear signal amplitude and the corresponding predetermined linear signal amplitude;
causing said compensating signal to be one of polarity when said transducer output exceeds said predetermined characteristic and opposite in polarity to said one polarity when said transducer output is less than said predetermined characteristic; and
summing said compensating signal and the nonlinear output signal to produce a summation signal having an amplitude characteristic corresponding to the predetermined linearly responsive characteristic.

* * * * *